US011002981B2

(12) United States Patent
Kaya et al.

(10) Patent No.: US 11,002,981 B2
(45) Date of Patent: May 11, 2021

(54) ANTI-VIBRATION DEVICE AND BINOCLE

(71) Applicant: FUJIFILM Corporation, Tokyo (JP)

(72) Inventors: Akimasa Kaya, Saitama (JP); Kouhei Awazu, Saitama (JP)

(73) Assignee: FUJIFILM Corporation, Tokyo (JP)

(*) Notice: Subject to any disclaimer, the term of this patent is extended or adjusted under 35 U.S.C. 154(b) by 354 days.

(21) Appl. No.: 16/015,869

(22) Filed: Jun. 22, 2018

(65) Prior Publication Data
US 2018/0299690 A1 Oct. 18, 2018

Related U.S. Application Data

(63) Continuation of application No. PCT/JP2016/084470, filed on Nov. 21, 2016.

(30) Foreign Application Priority Data

Dec. 25, 2015 (JP) .............................. JP2015-253274

(51) Int. Cl.
*G02B 27/64* (2006.01)
*G02B 23/18* (2006.01)
(Continued)

(52) U.S. Cl.
CPC .......... *G02B 27/646* (2013.01); *G02B 23/02* (2013.01); *G02B 23/18* (2013.01); *H02K 41/0356* (2013.01)

(58) Field of Classification Search
CPC ...... G02B 27/646; G02B 23/02; G02B 23/18; G02B 7/06; G02B 25/004; G02B 27/64; H02K 41/0356
(Continued)

(56) References Cited

U.S. PATENT DOCUMENTS 6,130,993 A * 10/2000 Hayakawa ........... G02B 27/646
348/E5.046
2005/0237608 A1* 10/2005 Yamanouchi .......... G02B 23/18
359/409
(Continued)

FOREIGN PATENT DOCUMENTS

JP 6-250098 A 9/1994
JP 10-333201 A 12/1998
(Continued)

OTHER PUBLICATIONS

International Preliminary Report on Patentability and Written Opinion of the International Searching Authority (forms PCT/IB/373, PCT/ISA/237 and PCT/IB/326), dated Jul. 5, 2018, for International Application No. PCT/JP2016/084470, with an English translation of the Written Opinion.
(Continued)

*Primary Examiner* — Stephone B Allen
*Assistant Examiner* — Rahman Abdur
(74) *Attorney, Agent, or Firm* — Birch, Stewart, Kolasch & Birch, LLP

(57) ABSTRACT

Barrels are attached so as to be rotated around first rotational axes. Reflective members are fixed to the barrels, and reflective members are attached so as to be rotated around second rotational axes. Rotation amounts are equal to each other in rotation of the pair of left and right barrels around the first rotational axes and rotation of the reflective members of the barrels around the second rotational axes due to a link mechanism having a first link member and a second link member. Image blurring in a yaw direction is corrected due to movement of the first link member in an X axis direction. Image blurring in a pitch direction is corrected due to movement of the second link member in a Y axis direction.

7 Claims, 15 Drawing Sheets

(51) Int. Cl.
*G02B 23/02* (2006.01)
*H02K 41/035* (2006.01)

(58) Field of Classification Search
USPC ........ 359/407, 404, 405, 410, 419, 646, 683
See application file for complete search history.

(56) References Cited

U.S. PATENT DOCUMENTS

2014/0368905 A1* 12/2014 Arai ................. G02B 23/02
359/399
2016/0248949 A1* 8/2016 Godler ............... H04N 5/23287

FOREIGN PATENT DOCUMENTS

| JP | 11-295774 A | 10/1999 |
| JP | 11-305276 A | 11/1999 |

OTHER PUBLICATIONS

International Search Report (form PCT/ISA/210), dated Feb. 14, 2017, for International Application No. PCT/JP2016/084470, with an English translation.

* cited by examiner

ANTI-VIBRATION DEVICE AND BINOCLE

CROSS-REFERENCE TO RELATED APPLICATIONS

This application is a Continuation of PCT International Application No. PCT/JP2016/084470 filed on 21 Nov. 2016, which claims priority under 35 U.S.C § 119(a) to Japanese Patent Application No. 2015-253274 filed on 25 Dec. 2015. The above application is hereby expressly incorporated by reference, in its entirety, into the present application.

BACKGROUND OF THE INVENTION

1. Field of the Invention

The present invention relates to an anti-vibration device and a binocle which prevent image blurring of an optical image.

2. Description of the Related Art

Monocles each having a single telephoto optical system, binocles each having a pair of telephoto optical systems arranged in the left-right direction, and the like are known as an optical observation device for observing an optical image of a distant view in an enlarged manner. Further, in order to prevent image blurring of an optical image from being caused by vibration such as hand shaking, optical observation devices each comprising an anti-vibration optical system that corrects image blurring of the optical image have been known.

Some anti-vibration optical systems of the optical observation devices may correct image blurring by driving an erecting prism provided in a telephoto optical system, or may correct image blurring by driving a plurality of reflection mirrors. The anti-vibration optical system, which drives the reflection mirrors, is characterized by having a weight lighter than and costs lower than that of the anti-vibration optical system which drives the erecting prism.

JP1998-333201A (JP-H10-333201A) describes an optical observation device in which an anti-vibration optical system having first to fourth reflective members is disposed between an objective optical system and an ocular optical system constituting, a telephoto optical system. The first to fourth reflective members are formed of reflection mirrors. The anti-vibration optical system of JP1998-333201A (JP-H10-333201A) forms a second optical axis by deflecting a first optical axis of the objective optical system through a first reflective member, forms a third optical axis by deflecting the second optical axis through a second reflective member, forms a fourth optical axis by deflecting the third optical axis through the third reflective member, and forms a fifth optical axis, along which light is incident onto the ocular optical system, by deflecting the fourth optical axis through a fourth reflective member. The second reflective member and the third reflective member are formed as movable reflective members which are rotatable. With such a configuration, by separately rotating the second reflective member and the third reflective member respectively around two rotational axes orthogonal to each other, it is possible to correct image blurring in a first direction (pitch direction) and a second direction (yaw direction).

JP1999-305276A (JP-H11-305276A) describes a photography optical system in which an anti-vibration optical system comprising a first movable mirror and a second movable mirror is disposed on the image side of a photography lens. The first movable mirror is disposed to deflect an optical axis of the photography lens upward, and the second movable mirror is disposed to deflect an optical axis of light, which is reflected by the second movable mirror, in a direction in which the optical axis becomes perpendicular to an optical axis of the photography lens and a plane including an optical axis deflected along first reflected light. A film is disposed on a focal plane of the optical axis of the light reflected by the second movable mirror. By separately rotating the first movable mirror and the second movable mirror, it is possible to correct image blurring, which is caused by movement of an imaging apparatus, on a film surface.

SUMMARY OF THE INVENTION

In the optical observation device such as the binocle, in order to correct image blurring of an observation image, an anti-vibration optical system is used. The anti-vibration optical system is built into the observation device, and therefore it is preferable that the anti-vibration optical system has a small size and a light weight in order to secure a storage space, increase a response speed, and improve portability. However, four reflective members are necessary for the anti-vibration optical system of JP1998-333201A (JP-H10-333201A), and an optical path is also elongated by the number of reflective members. Thus, it is difficult to decrease a weight and a size thereof.

As in JP1999-305276A (JP-H11-305276A), it can be considered that the anti-vibration optical system is constituted of only two movable reflective members. However, this configuration has a problem in that a direction of the optical axis of the photography lens, along which light is incident into the anti-vibration optical system, is orthogonal to a direction of an optical axis of light emitted from the anti-vibration optical system. Further, by changing directions of reflection of the two reflective members, the direction of the optical axis of light incident into the anti-vibration optical system is made to coincide with the direction of the optical axis of the emitted light. However, in a case where the two reflective members are separately rotated in this state, an optical image rotates about the optical axis. Thus, there is a problem in that appropriate observation or imaging cannot be performed.

Thus, the present inventors have developed an anti-vibration device capable of reducing the number of reflective members by performing anti-vibration in the pitch direction while one reflective member of the first reflective member and the second reflective member is fixed and the other reflective member is rotated and performing anti-vibration in the yaw direction while a pair of left and right holding members that each holds the first reflective member and the second reflective member is disposed and the holding members are rotated. However, such an anti-vibration device can reduce the number of reflective members, but needs to rotate the reflective members held by the holding members in order to perform the anti-vibration in the pitch direction while the holding members are rotated in order to perform the anti-vibration in the yaw direction. Accordingly, a device for smoothly performing both the anti-vibration in the yaw direction and the pitch direction so as not to hinder the linkage thereof.

In order to solve the problems, an object of the present invention is to provide an anti-vibration device and a binocle which are capable of moving a pair of holding members by disposing the pair of holding members such that one reflective members of the first reflective members and the second reflective members are fixed and the other reflective members thereof are rotated and setting rotation amounts of the pair of holding members and the other reflective members to be equal to each other.

In order to achieve the object, an anti-vibration device of the present invention includes first reflective members, second reflective members, holding members, and a link mechanism. The first reflective members are disposed so as to be respectively inclined with respect to first optical axes and form second optical axes by deflecting the first optical axes. The second reflective members are disposed so as to be respectively inclined with respect to the second optical axes and form third optical axes parallel to the first optical axes by deflecting the second optical axes. The holding members each hold the first reflective member and the second reflective member, and are disposed so as to be respectively rotated around first rotational axes which are within a plane including the first optical axis and the second optical axis and cross the first optical axes or the third optical axes. The holding members each fix and hold one of the first reflective member and the second reflective member in a fixed state and each hold the other reflective member so as to be rotated around a second rotational axis perpendicular to the plane including the first optical axis and the third optical axis. The link mechanism performs rotation of the pair of holding members around the first rotational axes and rotation of the other reflective members of the first reflective members and the second reflective members held by the pair of holding members around the second rotational axes in a state in which the first optical axes are held in parallel with each other. The link mechanism includes a first link member and a second link member. The first link member has pin coupling portions pin-coupled to the pair of holding members. The second link member is attached to the first link member so as to be rotated around third rotational axes parallel to the second rotational axes, and has abutment portions which engage with the other reflective members and rotate the other reflective members.

It is preferable that the first link member has brackets which protrude in a direction of the first optical axes, the second link member has arms which protrude in the direction of the first optical axes, and the brackets and the arms are attached so as to be rotated around the third rotational axes. A central line of the second rotational axes and a central line of the third rotational axes match each other in a neutral state before the holding members are rotated around the first rotational axes. A length of the bracket in the direction of the first optical axis, a length of the arm in the direction of the first optical axis, and a length of the holding member in the direction of the first optical axis from the first rotational axis to the pin coupling portion are equal to one another.

It is preferable that the anti-vibration device further comprises connecting pins that are provided on a rear side of the other reflective member, and engage with the abutment portions, circumferential surfaces that are respectively formed on the abutment portions and the connecting pins in order for the abutment portions and the connecting pins to be in point-contact with each other, and urging members that urge the circumferential surfaces in a direction in which the circumferential surfaces are in contact with each other.

It is preferable that the anti-vibration device further comprises a first actuator that moves the first link member in an arrangement direction of the holding members and a second actuator that rotates the second link member around the third rotational axis. The first actuator is a voice coil motor having a magnet and a coil, and the coil is fixed to the first link member. The second actuator is a voice coil motor having a magnet and a coil, and the coil is fixed to the second link member. It is preferable that the second optical axes and central lines of the first rotational axes are arranged on the same line.

A binocle of the present invention comprises objective optical systems each having a positive composite focal length, ocular optical systems, and the anti-vibration device provided between the objective optical systems and the ocular optical systems. It is preferable that the ocular optical systems each have a positive composite focal length, and erecting optical systems that invert an optical image in vertical and horizontal directions are provided between the anti-vibration device and the ocular optical systems.

According to the present invention, rotation amounts of a pair of holding members that is rotated around first rotational axes are equal to each other, and rotation amounts of the pair of other reflective members which are held by the pair of holding members and are rotated around second rotational axes are equal to each other. As a result, it is possible to smoothly move the reflective members and the holding members.

DESCRIPTION OF THE PREFERRED EMBODIMENTS

First Embodiment

Figure 1:
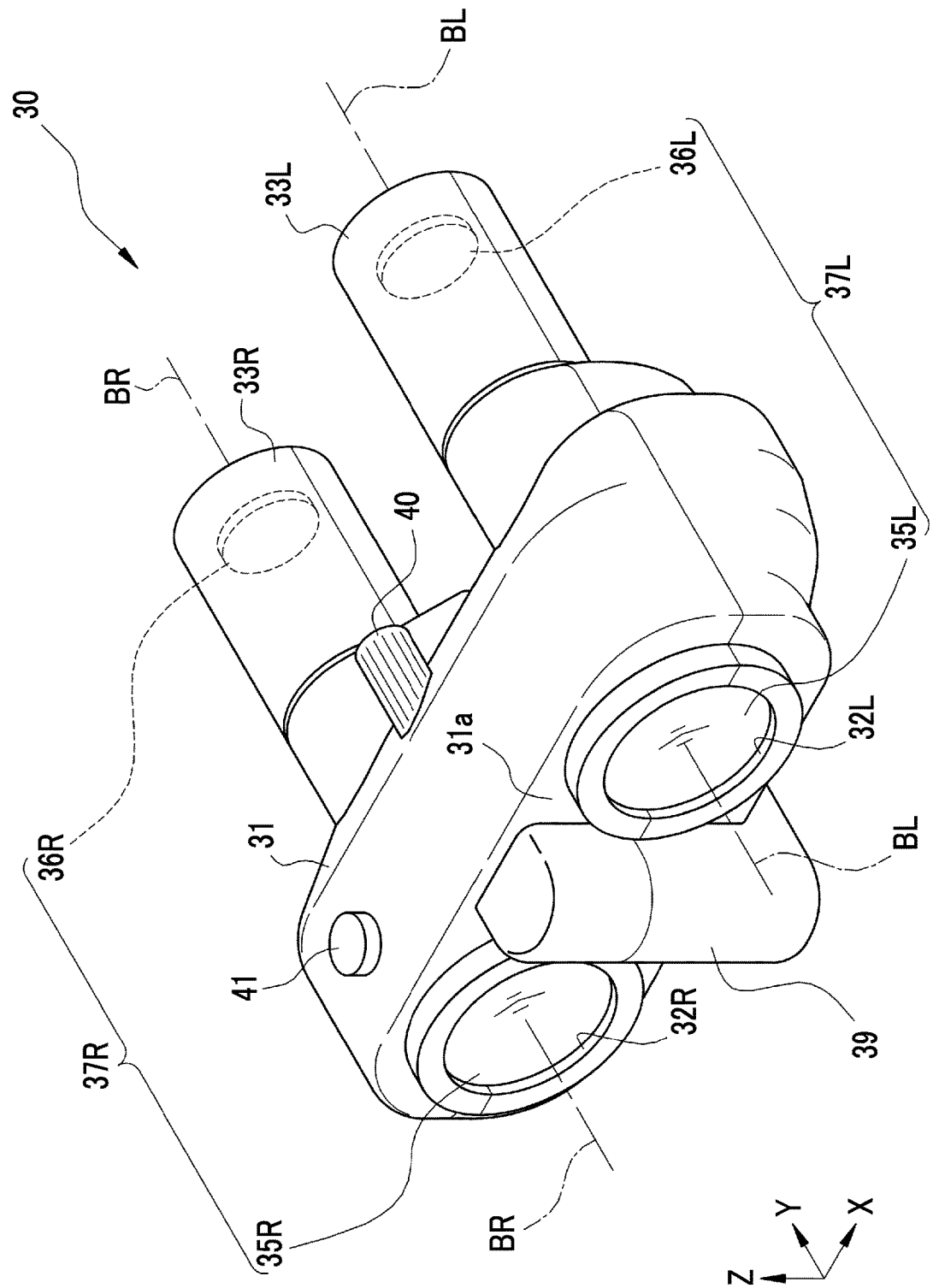
FIG. 1 is a perspective view illustrating an appearance of a binocle.

As shown in FIG. 1, a binocle 30 of the present embodiment is an optical observation device that is used to observe an optical image of a distant view in an enlarged manner through a pair of left telephoto optical system 37L and right telephoto optical system 37R which are constituted by telephoto optical systems.

Figure 2:
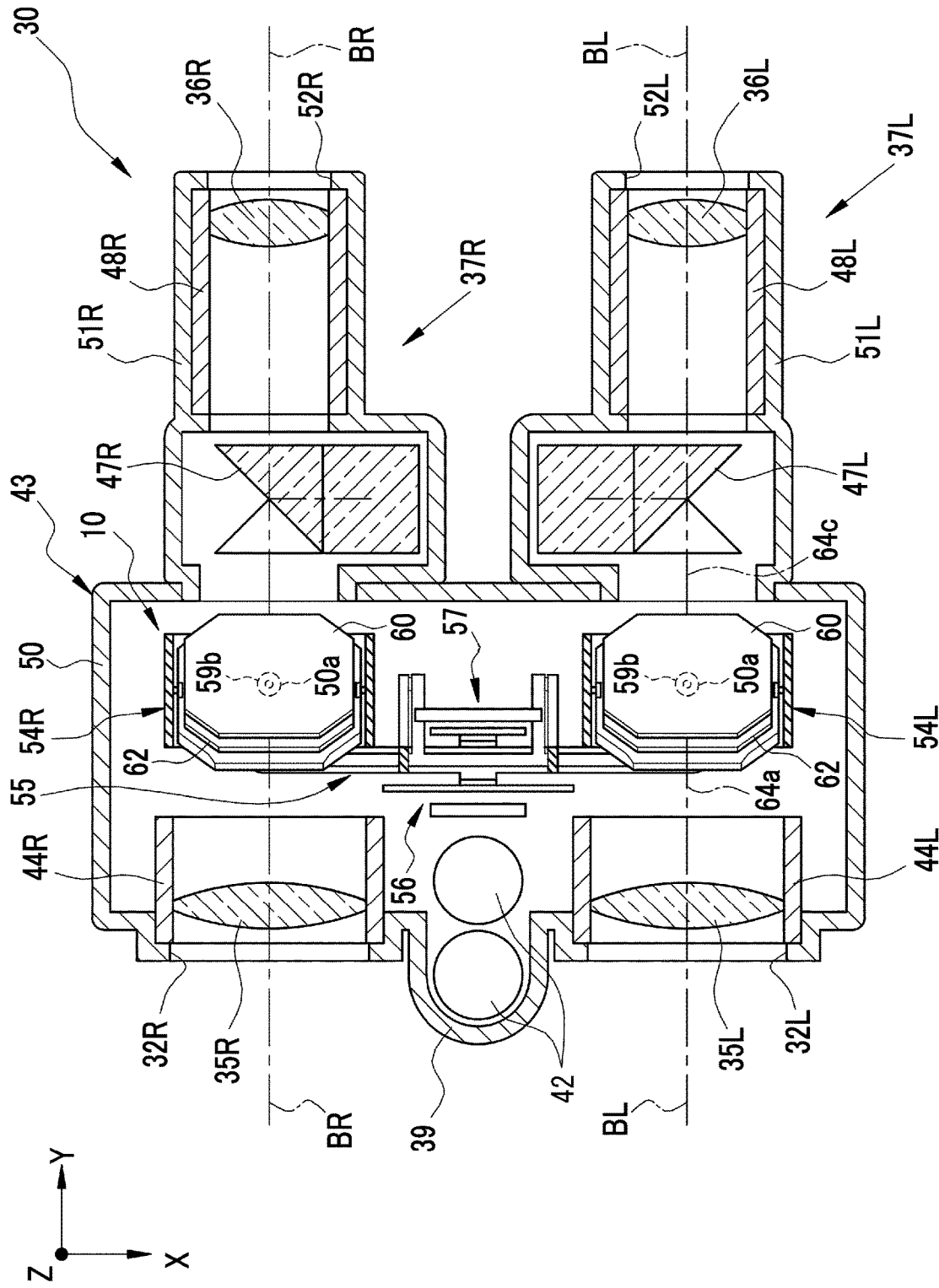
FIG. 2 is a horizontal cross section view of the binocle.

As shown in FIG. 2, an anti-vibration device 10 is provided in the left telephoto optical system 37L and the right telephoto optical system 37R of the binocle 30. Assuming that a front-back direction of the binocle 30 is a Y axis, a width direction orthogonal to the front-back direction is an X axis, and a vertical axis perpendicular to the Y axis and the X axis is a Z axis, the anti-vibration device 10 corrects image blurring in a pitch direction around the X axis and image blurring in a yaw direction around the Z axis.

As shown in FIG. 1, the binocle 30 includes a main body portion 31, and a pair of left eyepiece portion 33L and right eyepiece portion 33R. A pair of left objective opening 32L and right objective opening 32R is provided on a front surface 31a of the main body portion 31. The left eyepiece portion 33L and the right eyepiece portion 33R are provided on a rear side of the main body portion 31. Through the binocle 30, an enlarged image of an observation target can be observed by orienting the left objective opening 32L and the right objective opening 32R toward the observation target and viewing the observation target through the left eyepiece portion 33L and the right eyepiece portion 33R with both eyes in a state where the main body portion 31 is gripped.

Inside the left objective opening 32L and the right objective opening 32R, a left objective optical system 35L and a right objective optical system 35R are provided. Inside the left eyepiece portion 33L and the right eyepiece portion 33R, a left ocular optical system 36L and a right ocular optical system 36R are provided. The left objective optical system 35L, the right objective optical system 35R, the left ocular optical system 36L, and the right ocular optical system 36R each are composed of a lens having a positive composite focal length.

The left objective optical system 35L and the left ocular optical system 36L are disposed on a left-eye optical axis BL which is set along the front-back direction (Y axis direction) of the binocle 30, and constitute the left telephoto optical system 37L. Further, the right objective optical system 35R and the right ocular optical system 36R are disposed on a right-eye optical axis BR which is set in parallel to the left-eye optical axis BL in the width direction (X axis direction) orthogonal to the front-back direction of the binocle 30, and constitute the right telephoto optical system 37R.

A battery housing portion 39 is provided on the front surface 31a of the main body portion 31, between the left objective opening 32L and the right objective opening 32R. The battery housing portion 39 houses a battery 42 (see FIG. 2) that serves as a power supply of an anti-vibration control circuit 86 (see FIG. 15) to be described later. Further, an adjusting knob 40, which is rotated in a case where focus adjustment is performed, is provided on an upper portion on the rear side of the main body portion 31. A push-button-type power switch 41 is provided on a right side of an upper surface of the main body portion 31. The power switch 41 is pressed, and thus, the anti-vibration control circuit 86 is operated.

Figure 3:
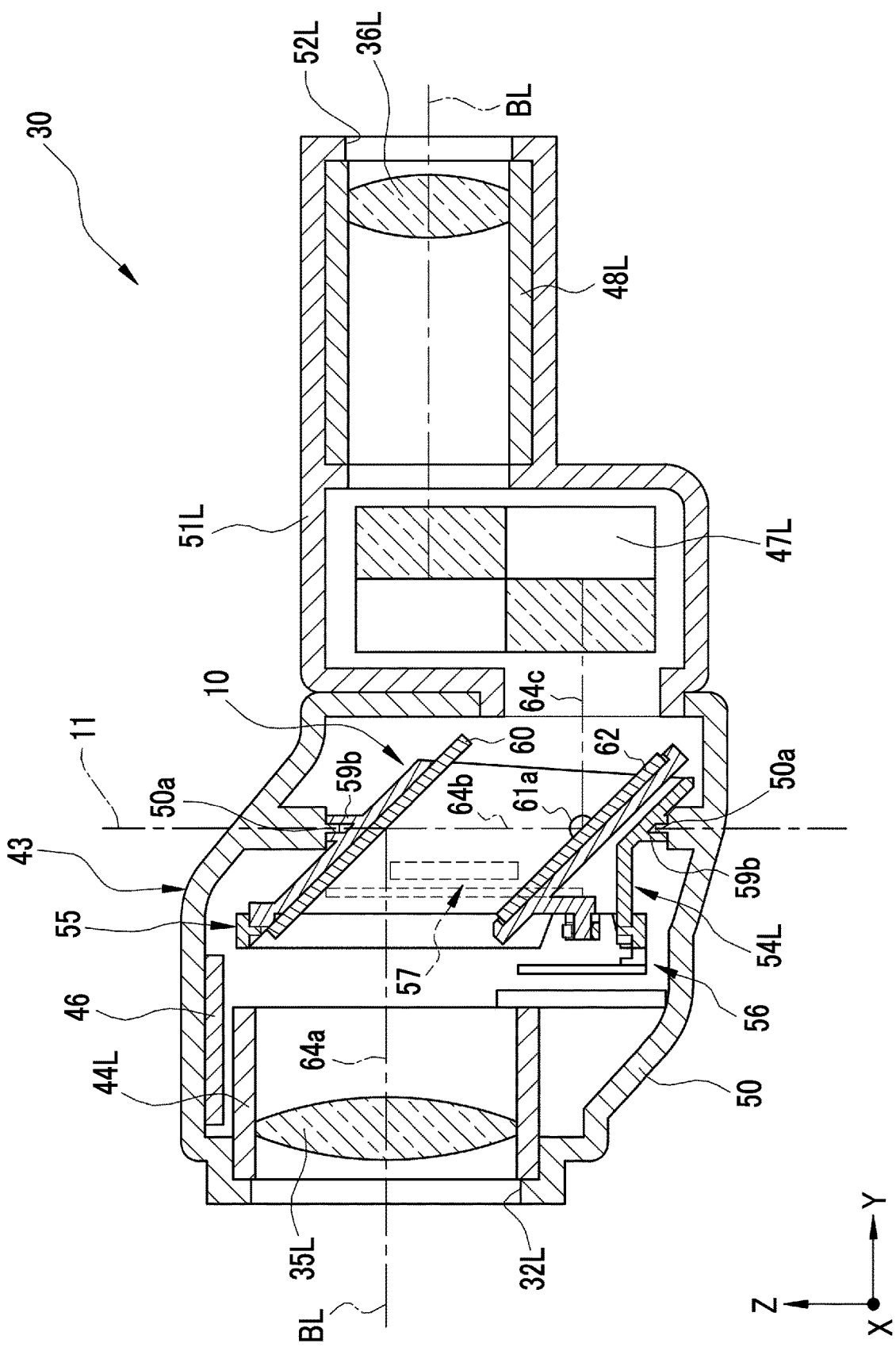
FIG. 3 is a vertical cross section view taken along a left-eye optical axis of the binocle.

FIG. 2 shows a horizontal cross section of the binocle 30, and FIG. 3 shows a vertical cross section taken along the left-eye optical axis BL. As shown in FIGS. 2 and 3, the binocle 30 comprises a casing 43, a left objective barrel 44L, a right objective barrel 44R, the anti-vibration device 10, a control substrate 46, a left erecting optical system 47L, a right erecting optical system 47R, a left eyepiece barrel 48L, and a right eyepiece barrel 48R. The anti-vibration device 10 including an anti-vibration optical system, the left erecting optical system 47L, and the right erecting optical system 47R constitute the left telephoto optical system 37L and the right telephoto optical system 37R.

The casing 43 comprises a casing main body 50, a left eyepiece casing 51L, and a right eyepiece casing 51R. The casing main body 50 is an exterior of the main body portion 31. The left eyepiece casing 51L is an exterior of the left eyepiece portion 33L. The right eyepiece casing 51R is an exterior of the right eyepiece portion 33R. The main body casing 53 houses the left objective barrel 44L, the right objective barrel 44R, the anti-vibration device 10, and the control substrate 46. The left eyepiece casing 51L houses the left erecting optical system 47L and the left eyepiece barrel 48L. Further, the right eyepiece casing 51R houses the right erecting optical system 47R and the right eyepiece barrel 48R.

A left eyepiece opening 52L and a right eyepiece opening 52R are respectively formed in the left eyepiece casing 51L and the right eyepiece casing 51R. The left eyepiece opening 52L and the right eyepiece opening 52R expose the left ocular optical system 36L and the right ocular optical system 36R to the outside. Further, the left eyepiece casing 51L and the right eyepiece casing 51R are fit into the casing main body 50 so as to be rotatable respectively around the left-eye optical axis BL and the right-eye optical axis BR. Accordingly, it is possible to adjust the left ocular optical system 36L and the right ocular optical system 36R in accordance with spacing between both eyes of a binocle user.

The left objective barrel 44L and the right objective barrel 44R have cylinder shapes, and the left objective optical system 35L and the right objective optical system 35R are respectively housed therein. The left objective barrel 44L and the right objective barrel 44R are held movably in an optical axis direction through a holding mechanism which is not shown. The holding mechanism moves the left objective barrel 44L and the right objective barrel 44R in the optical axis direction through a rotation operation of the adjusting knob 40.

Figure 4:
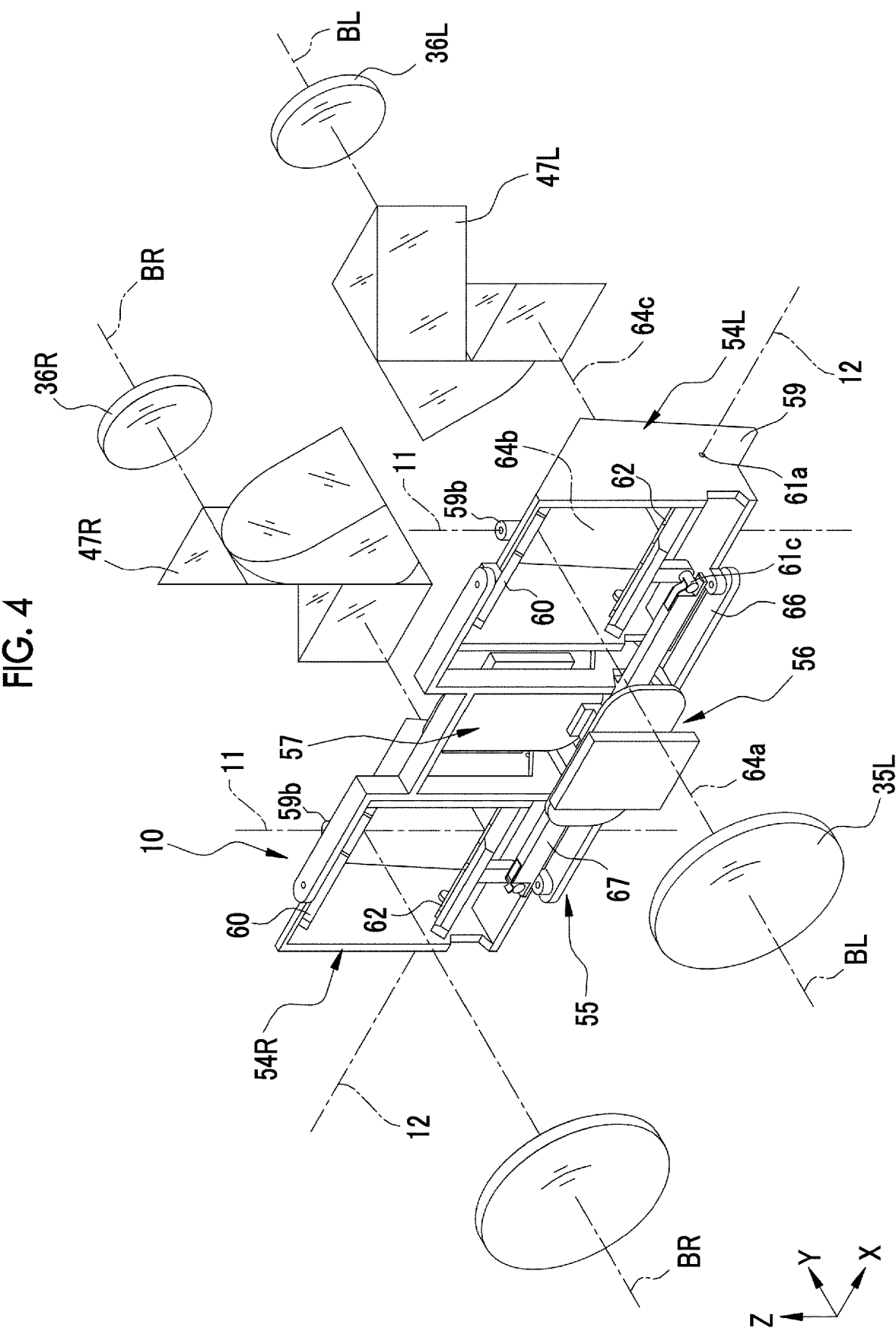
FIG. 4 is a perspective view illustrating a configuration of an anti-vibration device.

The anti-vibration device 10 is a device for correcting image blurring, which is caused by hand shaking and the like, on an optical image. As shown in FIG. 4, the anti-vibration device 10 comprises a left anti-vibration unit 54L, a right anti-vibration unit 54R, a link mechanism 55, a first actuator 56, and a second actuator 57.

The left anti-vibration unit 54L is a mechanism for correcting image blurring in the left telephoto optical system 37L. The left anti-vibration unit 54L is disposed between the left objective optical system 35L and the left ocular optical system 36L, and constitutes a part of the left telephoto optical system 37L. Further, the right anti-vibration unit 54R is a mechanism for correcting image blurring in the right telephoto optical system 37R. The right anti-vibration unit 54R is disposed between the right objective optical system 35R and the right ocular optical system 36R, and constitutes a part of the right telephoto optical system 37R.

The link mechanism 55 is a mechanism that links the left anti-vibration unit 54L and the right anti-vibration unit 54R with each other and that causes the left anti-vibration unit 54L and the right anti-vibration unit 54R to perform the same operations at the time of image blur correction. The first actuator 56 and the second actuator 57 are disposed between the left anti-vibration unit 54L and the right anti-vibration unit 54R, and operate the left anti-vibration unit 54L and the right anti-vibration unit 54R by driving the link mechanism 55. By using the link mechanism 55, it is possible to simplify control of an actuator, and it is possible to reduce a size and costs thereof.

The left erecting optical system 47L and the right erecting optical system 47R are optical systems that invert the optical image, in which image blurring is corrected through the anti-vibration device 10, in vertical and horizontal directions, and that causes light to be incident into the left ocular optical system 36L and the right ocular optical system 36R. In each of the left erecting optical system 47L and the right erecting optical system 47R, an erecting prism such as a Porro prism or a roof prism is used.

The left eyepiece barrel 48L and the right eyepiece barrel 48R have cylinder shapes, and the left ocular optical system 36L and the right ocular optical system 36R are respectively housed therein. In addition, for the sake of simplicity of drawings, the left objective optical system 35L, the right objective optical system 35R, the left ocular optical system 36L, and the right ocular optical system 36R each are shown as a single lens, but may be composed of a plurality of lenses.

Figure 5:
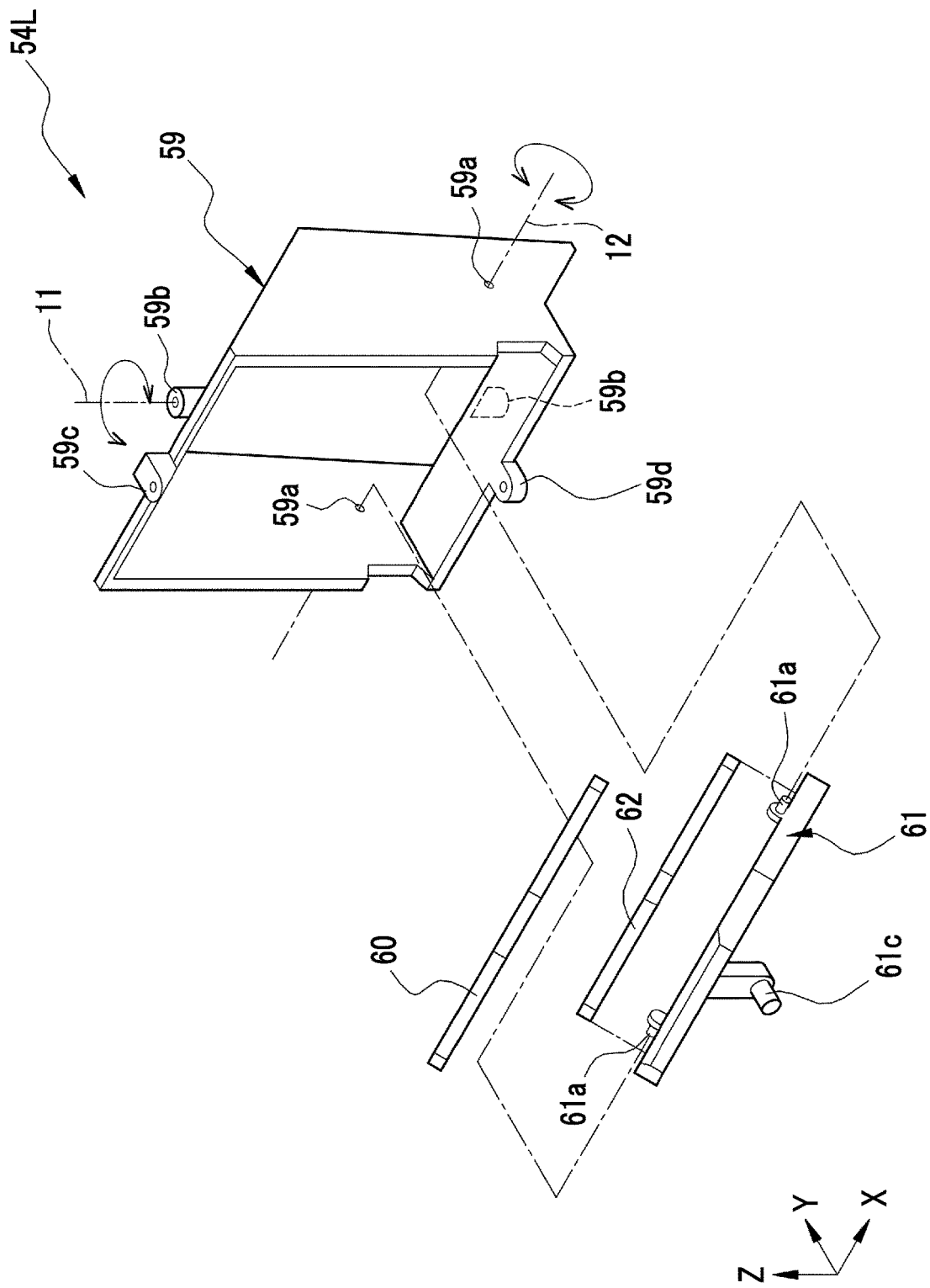
FIG. 5 is an exploded perspective view of a left anti-vibration unit.

As shown in FIG. 5, the left anti-vibration unit 54L comprises a barrel 59, a first reflective member 60, a holding plate 61, and a second reflective member 62. The barrel 59 has a box shape of which a front side and a rear side are opened. The first reflective member 60 is fixed in the barrel 59. The holding plate 61 is rotatably supported in the barrel 59. The second reflective member 62 is fixed onto an upper surface of the holding plate 61. In each of the first reflective member 60 and the second reflective member 62, for example, a surface-reflection-type reflection mirror is used. It should be noted that the barrel 59 and the holding plate 61 correspond to the holding member of the present invention.

The first reflective member 60 is inserted in the barrel 59, and is fixed onto an upper surface of an inner wall of the barrel 59 through an adhesive or the like such that a reflective surface thereof is oriented downward. As shown in FIG. 3, the upper surface of the inner wall of the barrel 59 viewed from the X axis direction is inclined at an angle of 45° with respect to a first optical axis 64a which is an optical axis of the left objective optical system 35L. Accordingly, the first reflective member 60 is also held at an angle of 45° with respect to the first optical axis 64a.

Referring back to FIG. 5, the holding plate 61 is a rectangular-plate-like member. The second reflective member 62 is fixed onto the upper surface of the holding plate 61 through an adhesive or the like such that the reflective surface thereof is oriented upward. A pair of rotation pins 61a is provided on both side surfaces of the holding plate 61. The pair of rotation pins 61a is inserted into a pair of bearing holes 59a which is formed in both side surfaces of the barrel 59 in a case where the holding plate 61 is inserted into the barrel 59. Thereby, the holding plate 61 and the second reflective member 62 are rotatably supported in the barrel 59. The pair of rotation pins 61a supported by the pair of bearing holes 59a constitutes a second rotational axis 12 of the present invention.

A bracket 61b, which protrudes downward, is provided on a lower surface (a rear side of the second reflective member 62) of the holding plate 61. A connecting pin 61c, which protrudes in the Y axis direction, is provided on a distal end of the bracket 61b. The holding plate 61 is rotated by the link mechanism 55 with the connecting pin 61c interposed therebetween. In addition, in a state (neutral state: states of FIGS. 3, 4, and 9) in which vibration does not occur on the binocle 30, an angle of the holding plate 61 is held by the link mechanism 55 such that the second reflective member 62 is parallel to the first reflective member 60.

As shown in FIGS. 3 and 5, a pair of bearing bosses 59b is provided on the same Z axis of an upper surface and a lower surface of the barrel 59. The bearing bosses 59b are rotatably supported by the pair of bearing pins 50a vertically provided on an upper surface and a lower surface of an inner wall of the casing main body 50. Thereby, the first reflective member 60 and second reflective member 62 held by the barrel 59 are integrally rotatable around the Z axis. The bearing pins 50a supported by the pair of bearing bosses 59b function as a first rotational axis 11 of the present invention. Further, a pair of upper connection boss 59c and lower connection boss 59d is provided on the same Z axis on upper and lower portions of the front side of the barrel 59. The pair of upper connection boss 59c and lower connection boss 59d are used for connection with the link mechanism 55.

The first reflective member 60 deflects the first optical axis 64a of the left objective optical system 35L through reflection, and thereby sets a second optical axis 64b which is at a right angle with respect to the first optical axis 64a. The second reflective member 62 deflects the second optical axis 64b through reflection, and thereby sets a third optical axis 64c which is parallel to the first optical axis 64a.

Each rotation pin 61a of the holding plate 61 is on a second rotational axis 12 that passes through an intersection between the second optical axis 64b and a reflective surface of the second reflective member 62 and is perpendicular to a plane formed by the first optical axis 64a and the second optical axis 64b. Consequently, by rotating the second reflective member 62 around the rotation pins 61a, a deflection direction of the third optical axis 64c is changed. As a result, it is possible to correct image blurring in the pitch direction.

The bearing bosses 59b of the barrel 59 are provided on the second optical axis 64b, and function as the first rotational axis 11. That is, the second optical axis 64b and central lines of the first rotational axis 11 are present on the same line. Accordingly, by integrally rotating the first reflective member 60 and the second reflective member 62 around the bearing bosses 59b, the deflection direction of the third optical axis 64c is changed. As a result, it is possible to correct image blurring in the yaw direction.

In addition, the right anti-vibration unit 54R has the same configuration as the left anti-vibration unit 54L, and is supported by the casing main body 50 so as to be rotatable around the Z axis in a manner similar to that of the left anti-vibration unit 54L. Further, the right anti-vibration unit 54R is connected to the link mechanism 55, with the same structure as the left anti-vibration unit 54L. Accordingly, a detailed description of the right anti-vibration unit 54R will be omitted.

Figure 6:
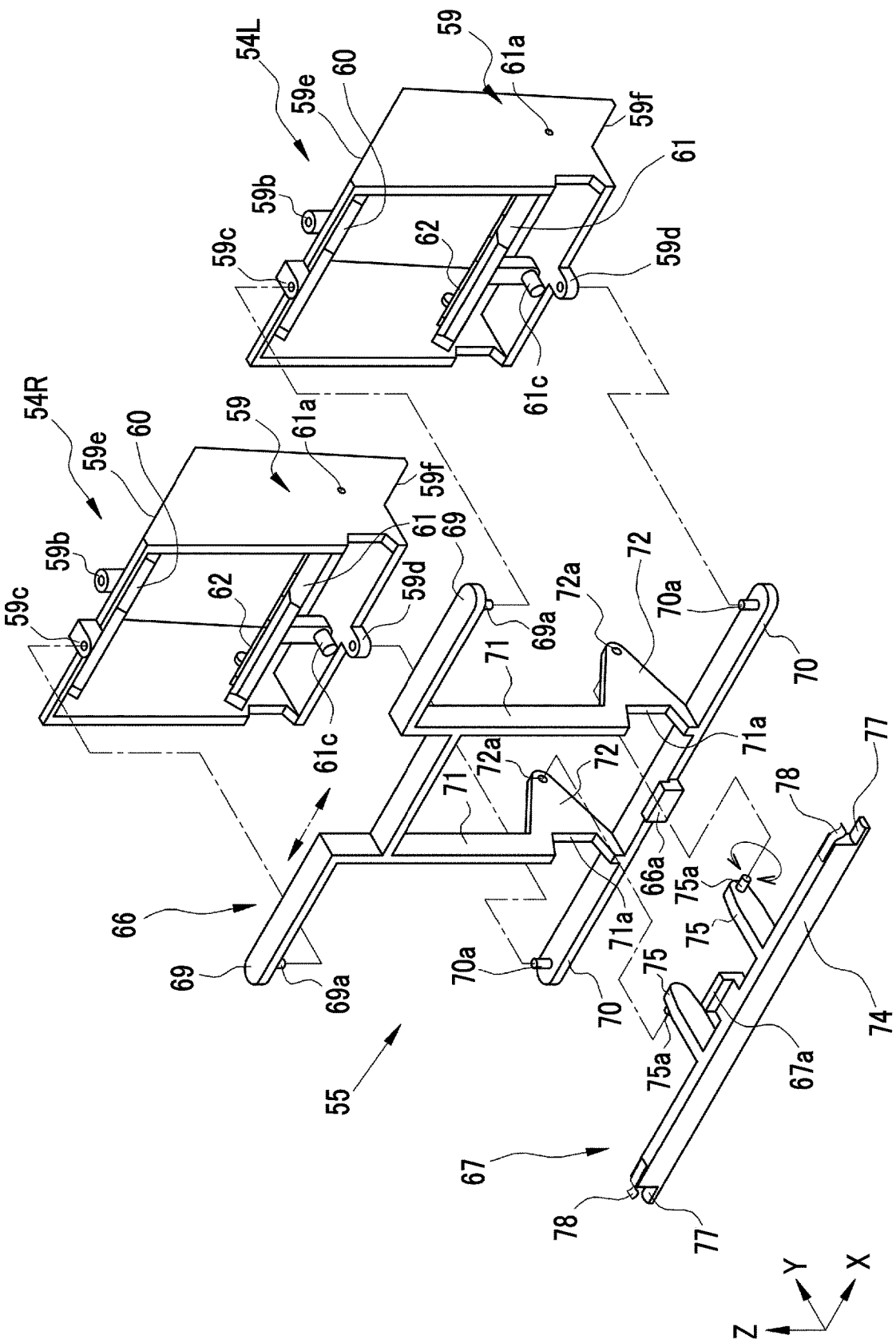
FIG. 6 is an exploded perspective view of a link mechanism.

As shown in FIG. 6, the link mechanism 55 comprises a first link member 66 and a second link member 67. The first link member 66 links the barrels 59 of the left anti-vibration unit 54L and the right anti-vibration unit 54R with each other through pin coupling portions 17 and 18.

Figure 7:
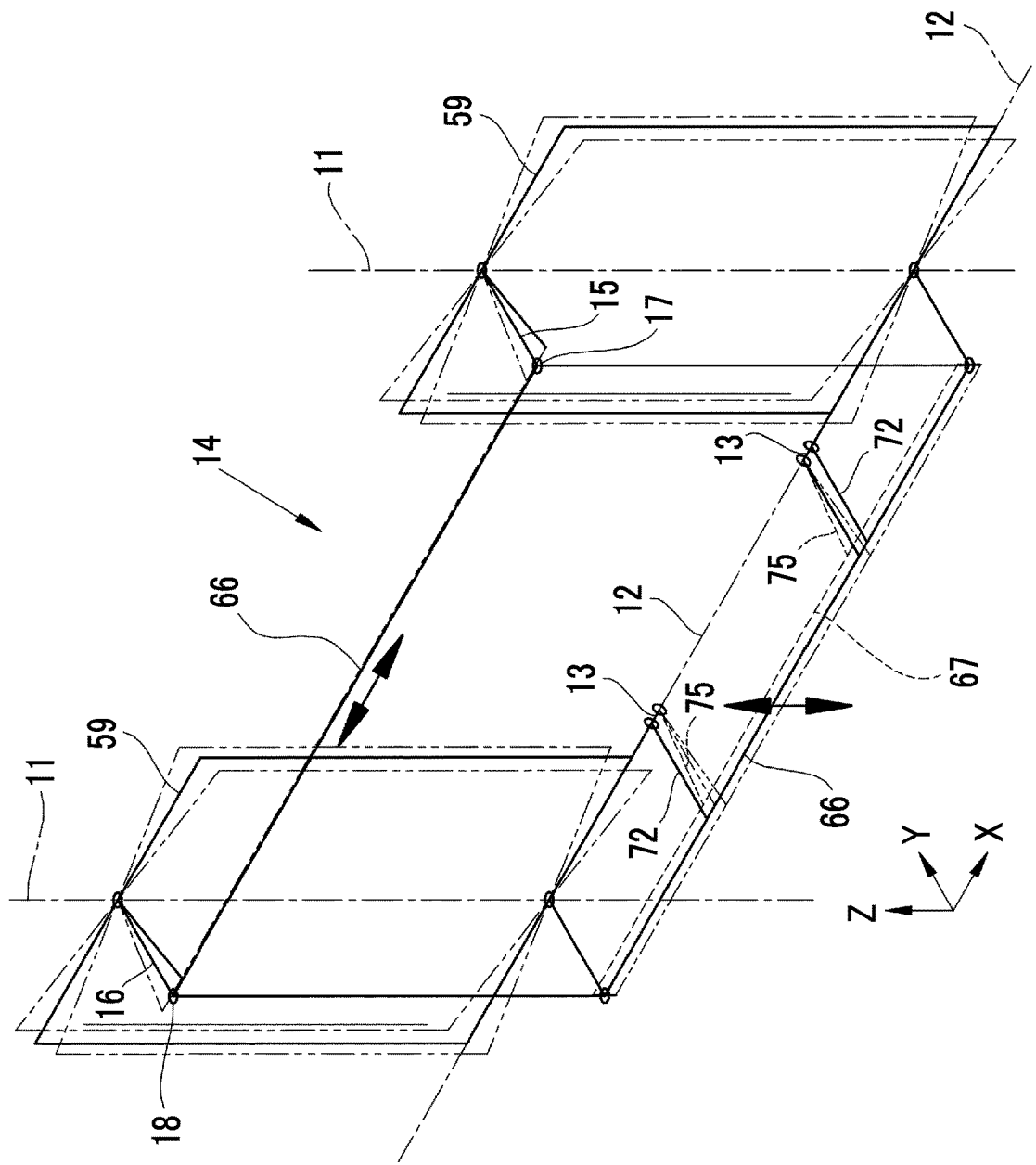
FIG. 7 is a skeleton diagram of the link mechanism.

The barrels 59 are coupled by the pin coupling portions 17 and 18 of the first link member 66, and thus, a four-joint link portion 14 having the first link member 66 is constituted as shown in FIG. 7. FIG. 7 is a skeleton diagram for describing the movement of the link mechanism 55, and shows the outline of the link mechanism 55.

As shown in FIG. 6, barrel upper plates 59e each having the bearing bosses 59b and the upper connection boss 59c of the barrel 59 and barrel lower plates 59f each having the bearing bosses 59b and the lower connection boss 59d of the barrel 59 function as intermediate links 15 and 16 shown in FIG. 7. The pin coupling portions 17 and 18 include the connection bosses 59c and 59d, and connecting pins 69a and 70a (see FIG. 6), and couple the intermediate links 15 and 16 and the first link member 66 together so as to rotate these components. The four-joint link portion 14 that horizontally moves the first link member 66 in the X axis direction is constituted by the intermediate links 15 and 16.

Referring back to FIG. 6, the second link member 67 links the second reflective members 62 of the left anti-vibration unit 54L and the right anti-vibration unit 54R with each other. The second link member 67 is rotatably supported by the first link member 66.

The first link member 66 comprises first brackets 69, second brackets 70, and a pair of connecting portions 71. A pair of left and right connecting pins 69a, which is inserted into the upper connection bosses 59c of the barrels 59, is provided on lower surfaces of the first brackets 69. A pair of connecting pins 70a, which is inserted into the lower connection bosses 59d of the barrels 59, on the left and right sides is provided on upper surfaces of the second brackets 70. The pair of connecting portions 71 is vertically disposed such that the first brackets 69 and the second brackets 70 are integrally formed.

A pair of left and right third brackets 72 is provided on the pair of connecting portions 71 between the barrels 59. The third brackets 72 protrude toward the ocular optical systems 36L and 36R (see FIG. 4) in the Y axis direction. Connection holes 72a are respectively formed in the third brackets 72 on the same X axis. Further, notches 71a are respectively provided in the pair of connecting portions 71 on a side opposite to a side on which the third brackets 72 are provided. The second link member 67 is accommodated within the notches 71a.

The second link member 67 comprises a stick-like link main body 74 and a pair of left and right connecting arms 75. The link main body 74 is provided along the X axis direction. The connecting arms 75 are provided in a center portion of the link main body 74 in the X axis direction. The pair of left and right connecting arms 75 is provided between the barrels 59, and protrudes toward the ocular optical systems 36L and 36R in the Y axis direction. The connecting arms 75 are provided inside the third brackets 72 near the third brackets 72.

Connecting pins 75a are provided on side surfaces of the connecting arms 75. The connecting pins 75a are inserted into the connection holes 72a formed in the third brackets 72 of the first link member 66. The connecting pins 75a supported by the connection holes 72a constitute a third rotational axis 13 (see FIG. 7). The second link member 67 links the third brackets 72 with the connecting arms 75 by using the third rotational axis 13, and is supported by the first link member 66 so as to be rotatable around the third rotational axis 13.

Figure 8:
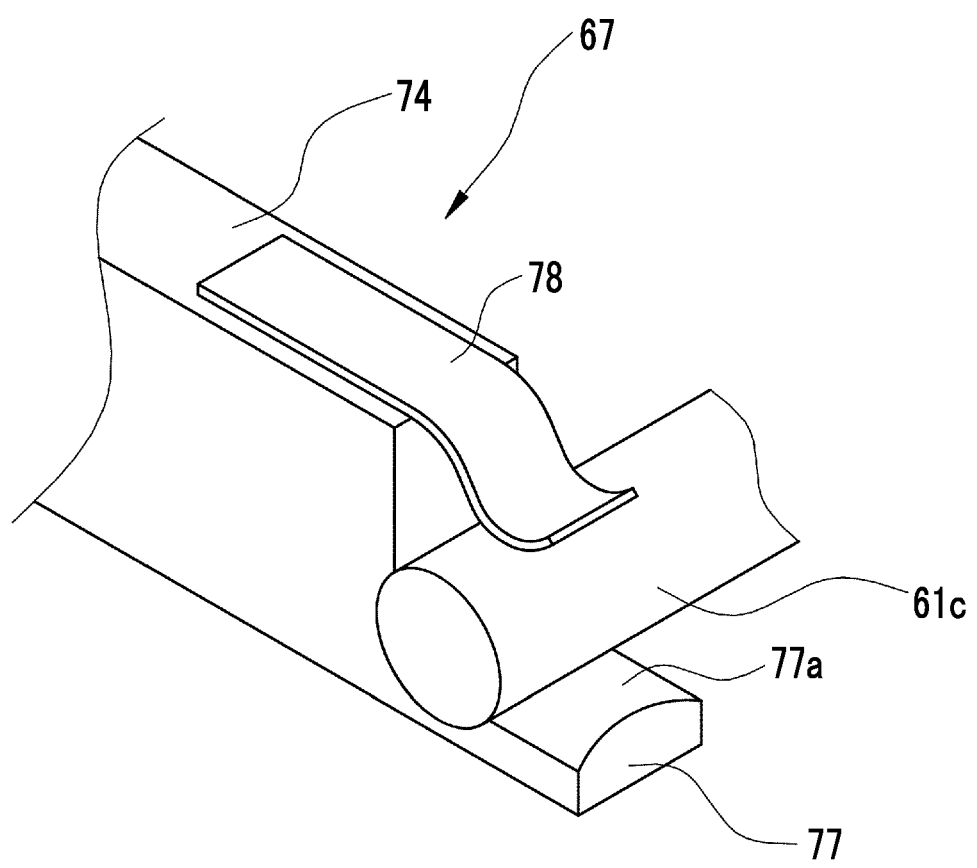
FIG. 8 is a perspective view illustrating a shape of an end portion of a second link member.

Abutment portions 77 are respectively formed on both ends of the link main body 74. The abutment portions 77 abut onto the connecting pins 61c of the holding plate 61. As shown in FIG. 8, an abutment surface 77a of the abutment portion 77 is formed as a circumferential surface. The abutment surface 77a and the connecting pin 61c are in contact with each other by the circumferential surface, and thus, the abutment portion 77 and the connecting pin 61c are in point-contact with each other even though the second link member 67 is rotated. Accordingly, a distance between the centers thereof is not changed. Therefore, the rotation of the second link member can be smoothly transferred to the connecting pins.

A pair of urging members 78 is attached to both ends of the link main body 74. The urging members 78 urge the connecting pins 61c of the holding plates 61 such the connecting pins abut on the abutment portions 77. As the urging members 78, for example, leaf springs made of metal plates or torsion springs are used.

Figure 9:
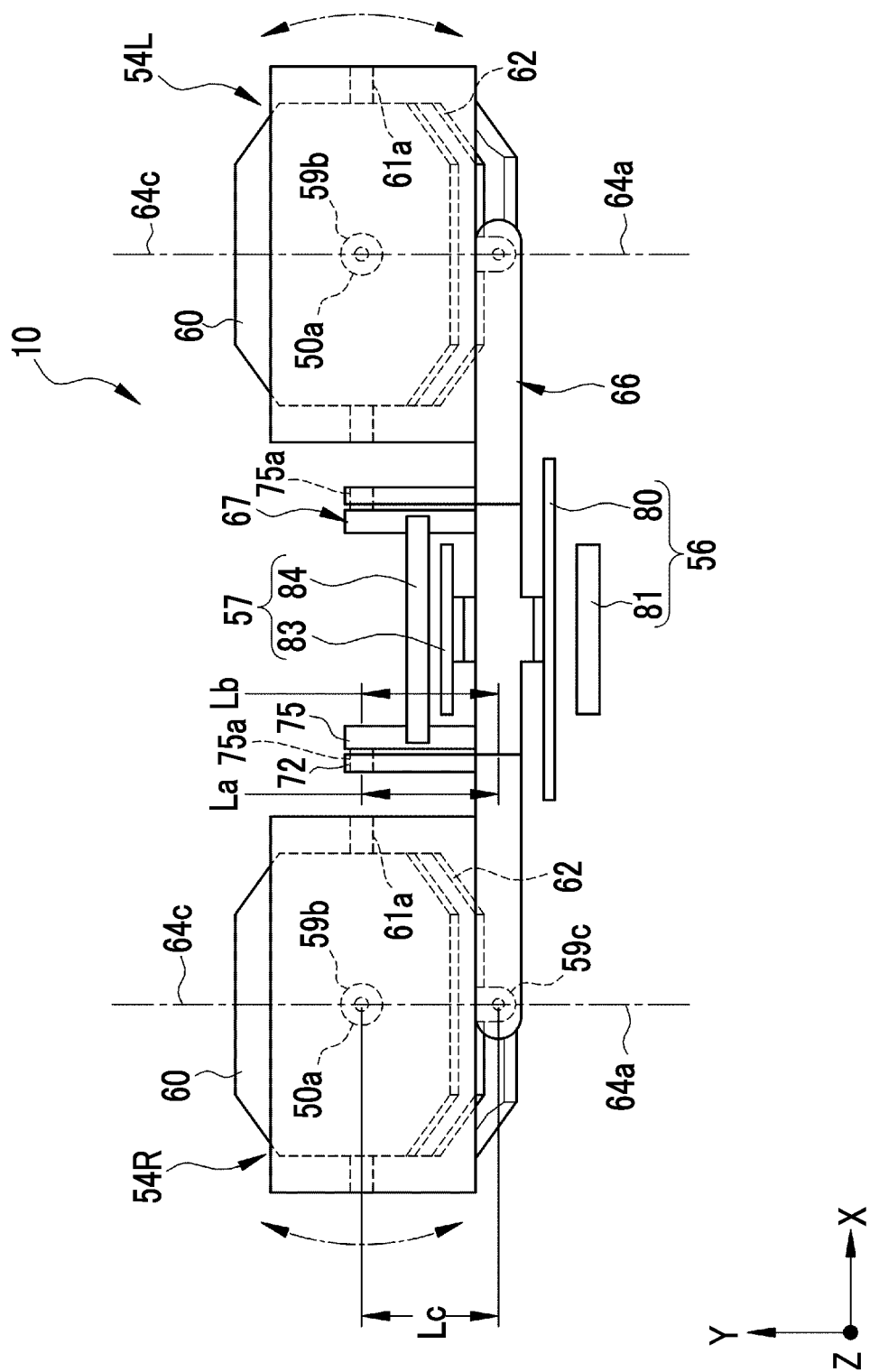
FIG. 9 is a plan view of the anti-vibration device.
Figure 10:
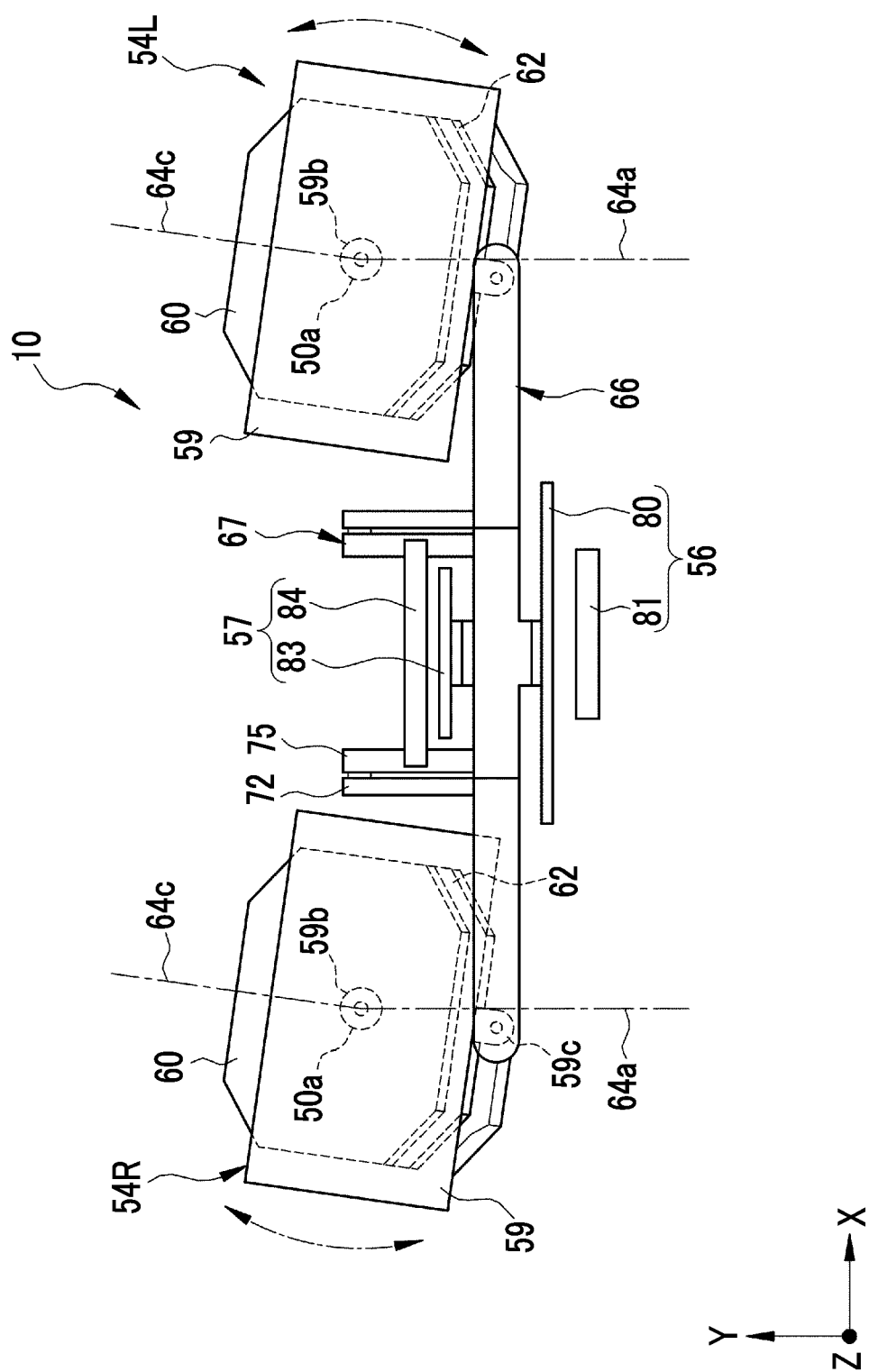
FIG. 10 is a plan view of the anti-vibration device at the time of blur correction.

As shown in FIGS. 7, 9 and 10, the link mechanism 55 rotates the barrels 59 of the left anti-vibration unit 54L and the right anti-vibration unit 54R around the first rotational axes 11 parallel to the Z axis with the bearing bosses 59b as the centers by moving the first link member 66 along the X axis direction. Thereby, the first reflective member 60 and the second reflective member 62 within the barrels 59 are respectively integrally rotated, and therefore a deflection direction of the third optical axis 64c is changed. As a result, image blurring in the yaw direction is corrected.

Figure 11:
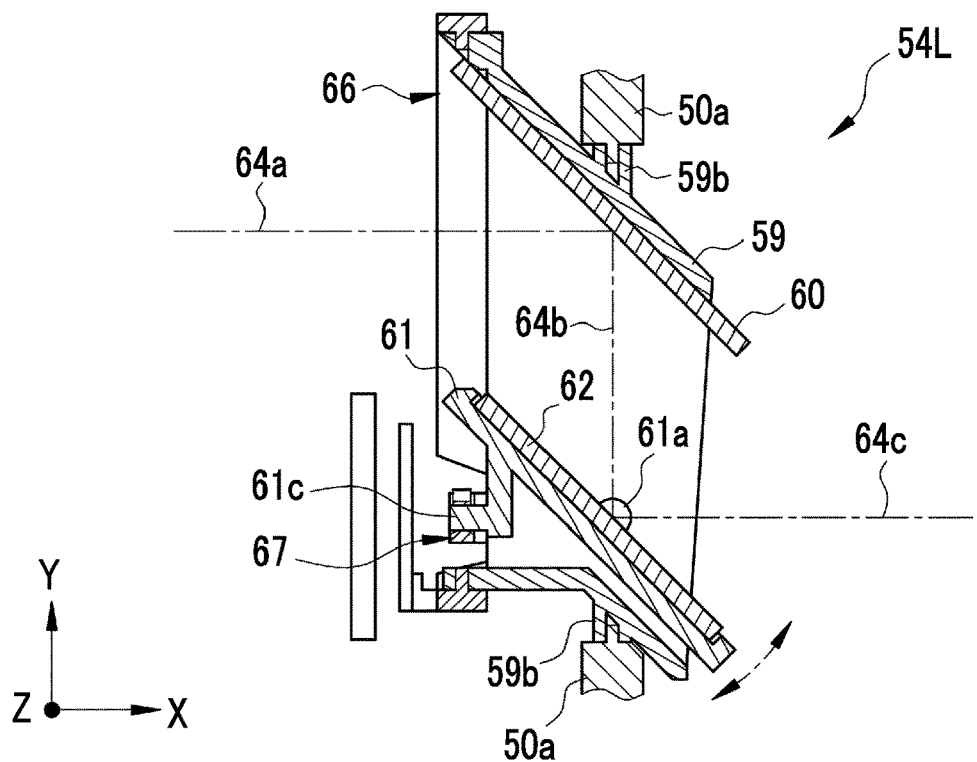
FIG. 11 is a vertical cross section view taken along an optical axis of the anti-vibration device for a left eye.
Figure 12:
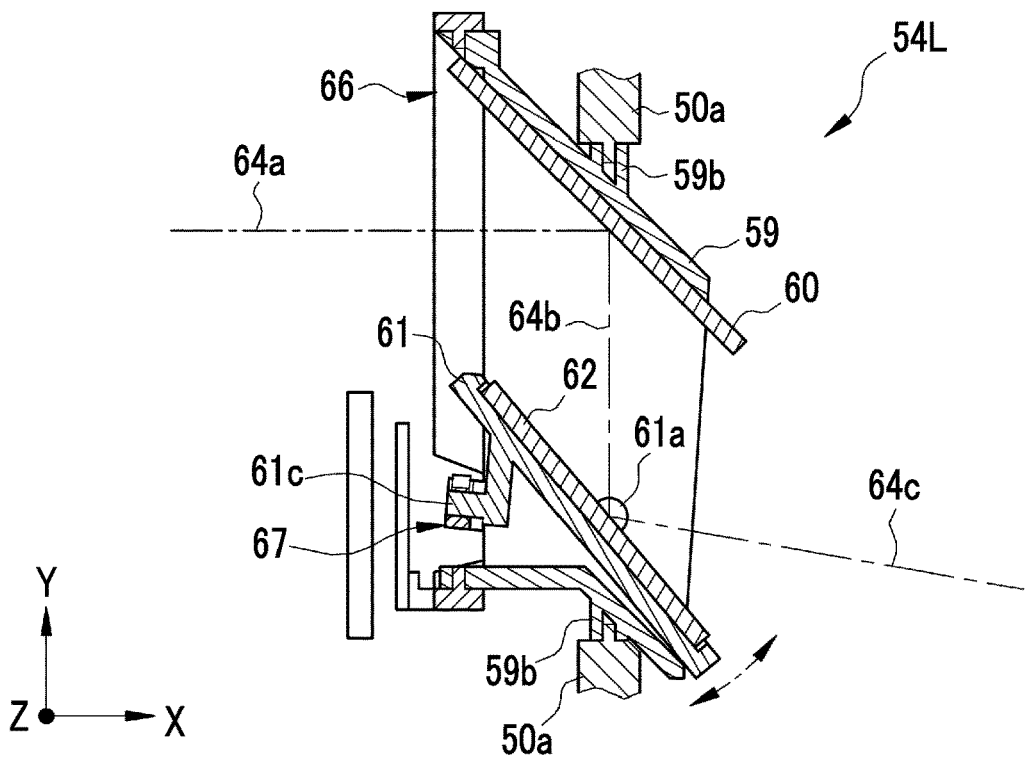
FIG. 12 is a vertical cross section view taken along the left-eye optical axis of the anti-vibration device at the time of blur correction.

Further, as shown in FIGS. 7, 11 and 12, in a case where the second link member 67 was rotated around the connecting pins 75a (third rotational axis 13), the second reflective members 62 of the left anti-vibration unit 54L and the right anti-vibration unit 54R are respectively rotated. Therefore, the deflection direction of the third optical axis 64c is changed, and thus, image blurring in the pitch direction is corrected.

It should be noted that a length (a length from the connecting pin 69a to the connection hole 72a) La of the third bracket 72 of the first link member 66 in the Y axis direction, a length (a length from the center of the link main body 74 to the connecting pin 75a) Lb of the connecting arm 75 of the second link member 67 in the same direction, and a length Lc from the upper connection boss 59c of the barrel 59 in the same direction to the bearing boss 59b (first rotational axis 11) are equal to each other. Accordingly, the second rotational axis 12 and the third rotational axis 13 are concentrically arranged with each other such that central lines thereof match each other, as shown in FIG. 7. With such a configuration, the length Lc, which is a radius of rotation when the anti-vibration units 54 are rotated by the first link member 66, and the lengths La and Lb, which are radii of rotations when the first reflective members 60 are rotated by the second link member 67, are equal to each other. Therefore, in a state where the anti-vibration units 54 are rotated (inclined), rotation of the second link member 67 is possible.

Figure 13:
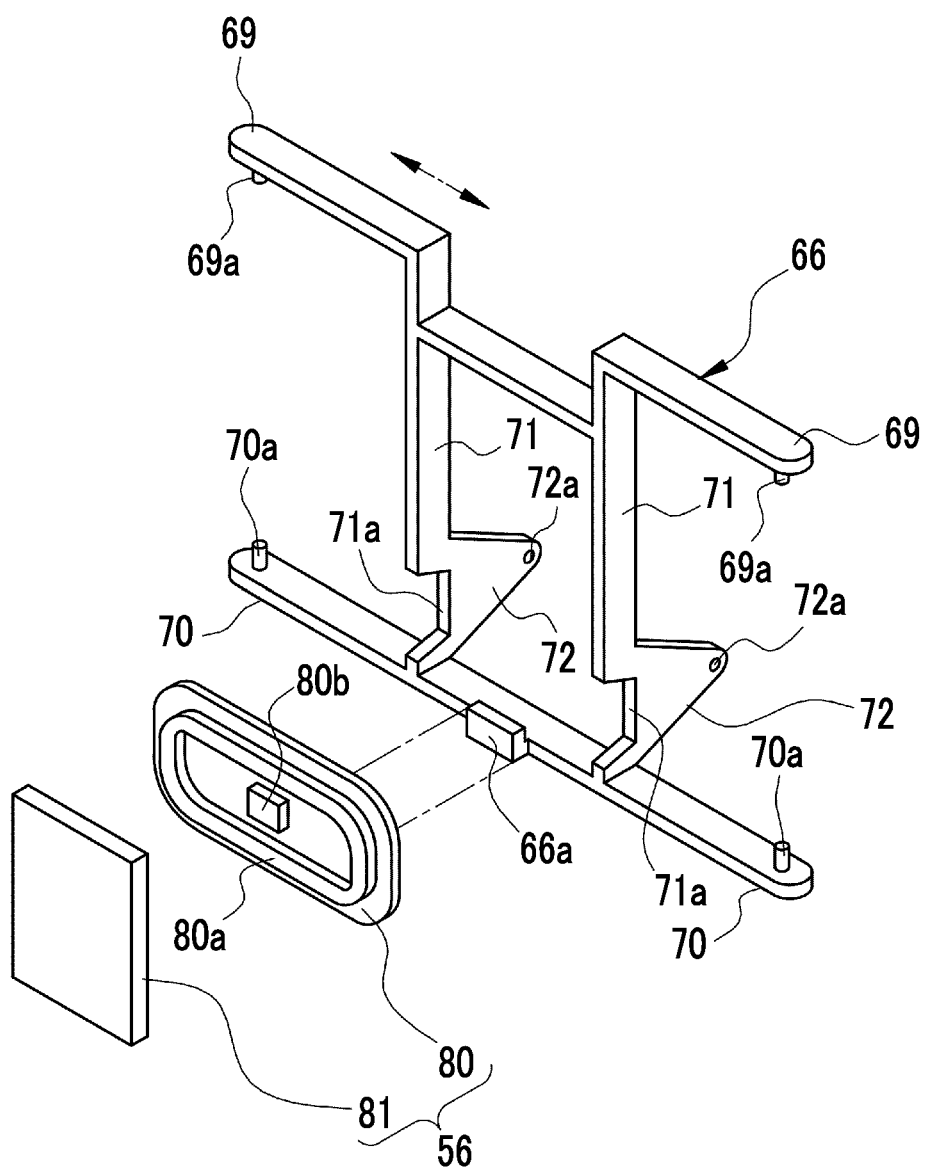
FIG. 13 is a perspective view of a first actuator.

As shown in FIG. 13, the first actuator 56 comprises a coil substrate 80 and a magnet 81. The coil substrate 80 is mounted on an attachment portion 66a of the first link member 66. The magnet 81 has a plate shape, and is fixed in the main body portion 31 so as to face the coil substrate 80. A coil 80a, around which a copper wire is wound, is provided on the coil substrate 80. The first actuator 56 is a so-called flat-coil-type voice coil motor, and drives the first link member 66 by applying current to the coil 80a and moving the coil substrate 80 in the X axis direction (an arrangement direction of the barrels 59) in magnetic field of the magnet 81.

An X-axis position sensor 80b is provided on the coil substrate 80. The X-axis position sensor 80b measures an amount of movement of the coil substrate 80 in the X axis direction inside the coil 80a. The X-axis position sensor 80b is, for example, a magnetic sensor such as a hall element, detects magnetic field of the magnet 81, and outputs a detection signal according to an intensity of the magnetic field.

Figure 14:
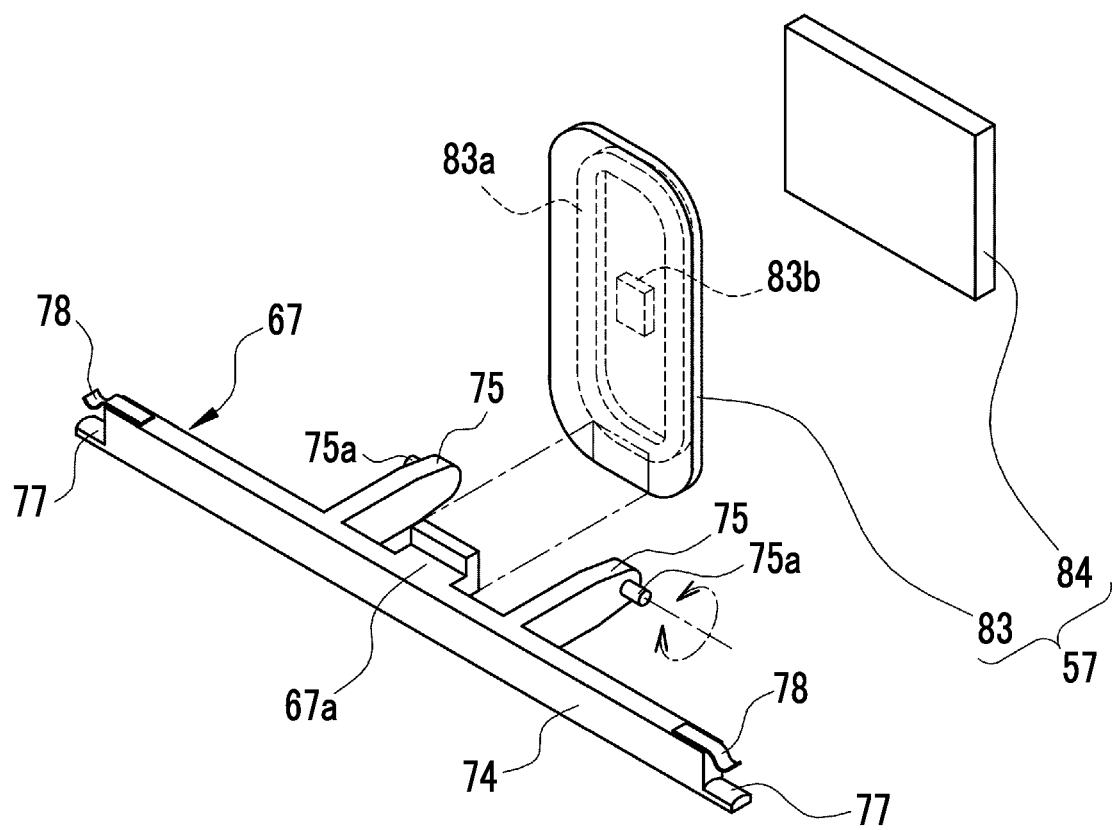
FIG. 14 is a perspective view of a second actuator.

As shown in FIG. 14, the second actuator 57 comprises a coil substrate 83 and a magnet 84. The coil substrate 83 is mounted on an attachment portion 67a of the second link member 67. The magnet 84 has a plate shape, and is fixed in the main body portion 31 so as to face the coil substrate 83. A coil 83a and a Z-axis position sensor 83b are provided on the coil substrate 83. The second actuator 57 is a voice coil motor which is the same as the first actuator 56, and drives the second link member 67 by applying current to the coil 83a and moving the coil substrate 83 in the Z axis direction in magnetic field of the magnet 84. The Z-axis position sensor 83b is a magnetic sensor which is the same as the X-axis position sensor 80b, and measures an amount of movement of the coil substrate 83 in the Z axis direction.

Figure 15:
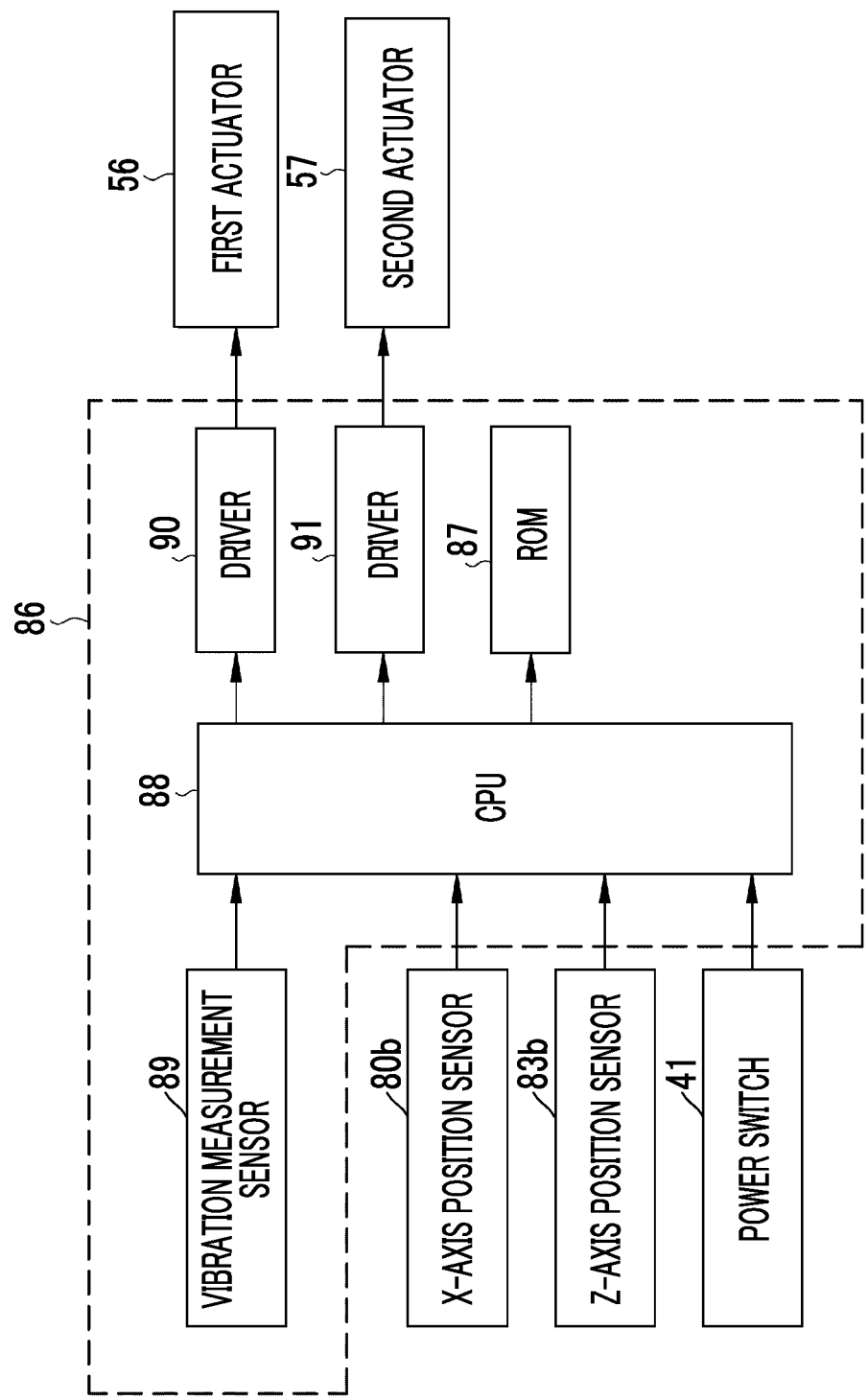
FIG. 15 is a block diagram of an anti-vibration control circuit.

As shown in FIG. 15, the anti-vibration control circuit 86 comprises a read only memory (ROM) 87, a central processing unit (CPU) 88, a vibration measurement sensor 89, and drivers 90 and 91. The anti-vibration control circuit 86 is provided on the control substrate 46 shown in FIG. 3. The ROM 87 stores a control program. The CPU 88 controls the anti-vibration device 10 on the basis of the control program. The vibration measurement sensor 89 measures amounts of vibration of the binocle 30 around the X and Z axes. The drivers 90 and 91 respectively drive the first actuator 56 and the second actuator 57. The CPU 88 is connected to the power switch 41, the X-axis position sensor 80b, and the Z-axis position sensor 83b.

Next, effects of the above-mentioned embodiment will be described. The anti-vibration control circuit 86 starts actuation through an ON operation of the power switch 41. The vibration measurement sensor 89 detects vibration of the binocle 30 around the X and Z axes, and outputs the detection signal to the CPU 88. The CPU 88 controls the drivers 90 and 91 on the basis of the detection signal of the vibration measurement sensor 89 and the position information of the coil substrate 80 and the coil substrate 83 detected by the X-axis position sensor 80b and the Z-axis position sensor 83b, and drives the first actuator 56 and the second actuator 57 so as to correct image blurring of an optical image.

In a case where image blurring in the pitch direction occurs in the binocle 30, the CPU 88 moves the coil substrate 83 of the second actuator 57 in the Z axis direction. The second link member 67 is rotated around the connecting pins 75a of the connecting arms 75 due to the movement of the coil substrate 83. The second reflective members 62 of the left anti-vibration unit 54L and the right anti-vibration unit 54R are rotated around the X axis with the rotation pins 61a as the centers due to the rotation. Thereby, the deflection direction of the third optical axis 64c is changed, and thus image blurring in the pitch direction is corrected.

Further, in a case where image blurring in the yaw direction occurs in the binocle 30, the CPU 88 moves the coil substrate 80 of the first actuator 56 in the X axis direction. The first link member 66 moves in the X axis direction due to the movement of the coil substrate 80. The respective barrels 59 of the left anti-vibration unit 54L and the right anti-vibration unit 54R is rotated around the Z axis with the bearing bosses 59b as the centers due to the movement. Accordingly, since the first reflective members 60 and the second reflective members 62 of the left anti-vibration unit 54L and the right anti-vibration unit 54R are integrally rotated and the deflection direction of the third optical axis 64c is changed, image blurring in the yaw direction is corrected.

In a case where image blurring in the pitch direction and the yaw direction occurs in the binocle 30, the CPU 88 drives the first actuator 56 and the second actuator 57. Accordingly, the first reflective members 60 and the second reflective members 62 of the left anti-vibration unit 54L and the right anti-vibration unit 54R are integrally rotated around the Z axis while rotating the second reflective members 62 of the left anti-vibration unit 54L and the right anti-vibration unit 54R around the X axis. Even in such a case where mixed image blurring is corrected, the first reflective member 60 and the second reflective member 62 are integrally rotated. Therefore, an optical image is prevented from rotating around the optical axis.

According to the binocle 30 of the present embodiment, compared with a binocle having an anti-vibration optical system formed of a reflective member used in the related art, the number of reflective members can be reduced. Therefore, it is possible to achieve reduction in size and weight and low costs for the binocle. Further, even in a case where the number of reflective members is reduced, an optical image is prevented from rotating. Thus, it is possible to appropriately perform observation of a distant view.

Due the link mechanism 55, rotation amounts of the pair of barrels 59 around the first rotational axis 11 and rotation amounts of the second reflective members 62 held by the pair of barrels 59 around the second rotational axes 12 can be equal to each other in a state in which the first optical axes 64a are held in parallel with each other.

The first link member 66 having the pin coupling portions 17 and 18 coupled to the pair of barrels 59 through pins is provided, and thus, the rotation amounts of the pair of barrels 59 can be equal to each other. The second link member 67 which is attached to the first link member 66 so as to be rotated around the third rotational axis 13 parallel to the second rotational axis 12 and has the abutment portions 77 which engage with the reflective members 62 and rotate the reflective members 62 is provided. Thus, the rotation amounts of the second reflective members within the barrels 59 can be equal to each other.

As shown in FIG. 9, the first link member 66 has the brackets 72 which protrude in a first optical axis direction (Y axis direction), and the second link member 67 has the arms 75 which protrude in the first optical axis direction. The brackets 72 and the arms 75 are attached so as to be rotated around the third rotational axes 13, the central line of the second rotational axis 12 and the central line of the third rotational axis 13 match each other in the neutral state before the barrels 59 are rotated around the first rotational axes 11. The length La of the bracket 72 in the Y axis direction, the length Lb of the arm 75 in the Y axis direction, and the length Lc in the Y axis direction to the pin coupling portions 17 and 18 from the first rotational axes 11 of the barrels 59 are equal to one another. As a result, it is possible to perform a smooth operation with no excessive restraint.

The first actuator 56 and the second actuator 57 are voice coil motors, the coil 80a is fixed to the first link member 66, and the coil 83a is fixed to the second link member 67. Accordingly, it is possible to perform an elaborate operation with a high response speed. A size thereof is reduced, and thus, it is possible to suppress manufacturing costs.

Second Embodiment

Figure 16:
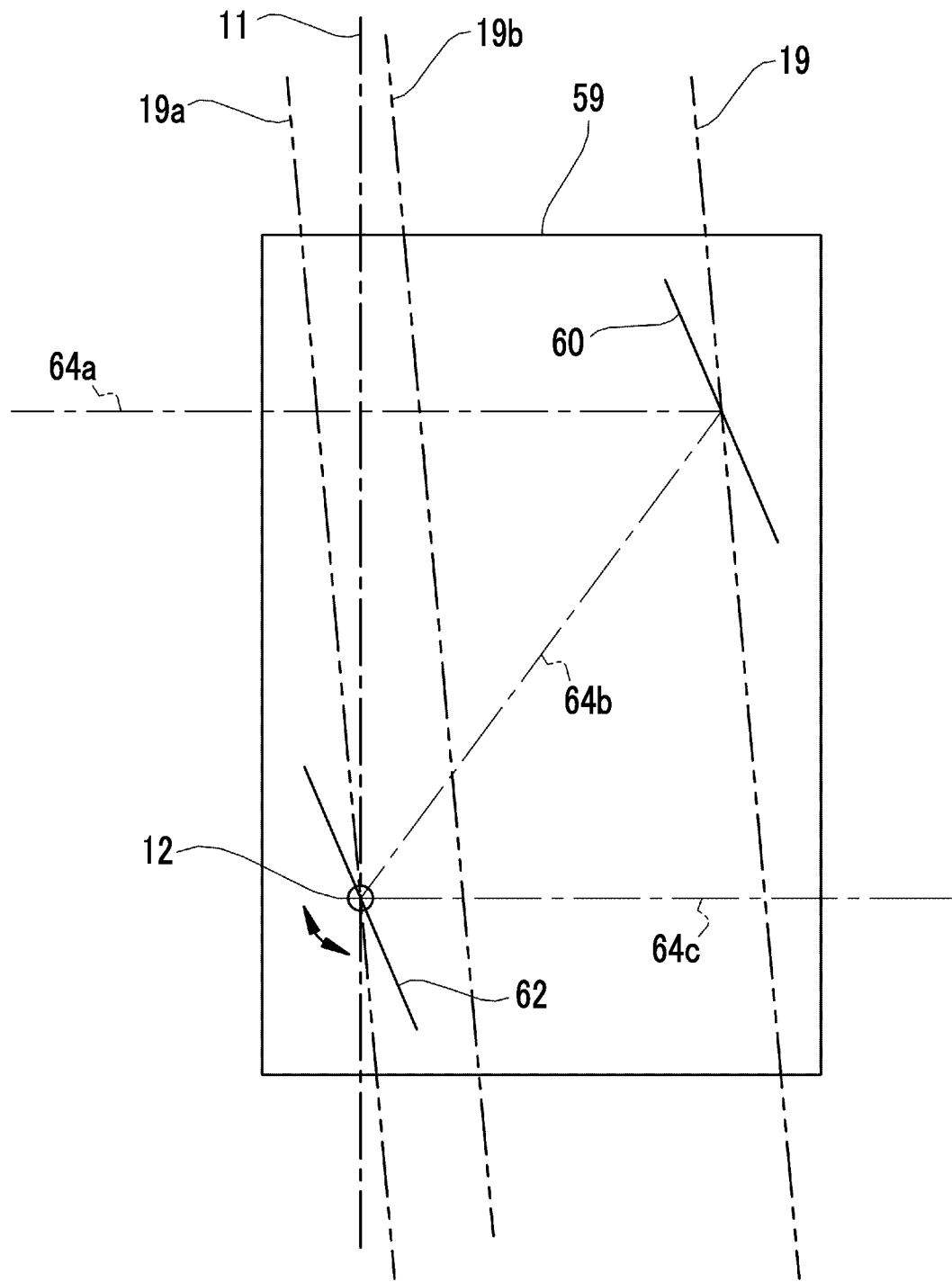
FIG. 16 is a skeleton diagram showing main parts of another link mechanism.

As shown in FIG. 4, in the first embodiment, the first reflective members 60 are inclined with respect to the first optical axes 64a of the objective optical systems at angles of 45°, and thus, the angle of the second optical axis 64b deflected with respect to the first optical axes 64a is set as 90°. In contrast, in a second embodiment shown in FIG. 16, the angle formed by the first optical axis 64a and the second optical axis 64b is smaller than 90°. Although not shown, the angle may be greater than 90°. Further, although it has been described in the first embodiment that the first rotational axis 11 and the second optical axis 64b are concentrically arranged with each other in a case where the barrels 59 that each hold the first reflective member 60 and the second reflective member 62 are integrally rotated, the present invention is not limited to thereto. For example, like a first rotational axis 19 represented by a dashed double-dotted line, the first rotational axis 19 can be freely selected as long as the first rotational axis passes through an intersection between the first optical axis 64*a* and the reflective surface of the first reflective member 60 and is within a plane including the first optical axis 64*a* and the second optical axis 64*b*. Like a first rotational axis 19*a*, the first rotational axis may be within the plane including the first optical axis 64*a* and the second optical axis 64*b*, and may be disposed so as to cross the second rotational axis 12. Further, like a first rotational axis 19*b*, the first rotational axis may be within the plane including the first optical axis 64*a* and the second optical axis 64*b*, and may be disposed so as to cross the first optical axis 64*a* or the third optical axis 64*c*.

Although it has been described in the embodiment that the first reflective members 60 are fixed to the barrels 59 and the second reflective member 62 is fixed to and held by the holding plate 61 so as to be rotatable, the second reflective members 62 may be fixed to the barrels 59, and the first reflective members may be held through the holding plate so as to be rotatable.

Although it has been described in the embodiment that the second rotational axis 12 and the third rotational axis 13 are concentrically arranged on the same extension line as shown in FIG. 7, the third rotational axis 13 may be parallel to the second rotational axis 12. Here, the second rotational axis 12 and the third rotational axis 13 are preferably arranged so as to be close to each other, and more preferably, are concentrically arranged with each other.

Although it has been described in the above-mentioned embodiment that the surface reflection mirrors are used as the reflective members 60 and 62, a prism of which the rear surface is reflective may be used as the reflective member. Furthermore, in the description of each embodiment, in order to show a positional relationship between a plurality of optical axes, a certain term such as a right angle or parallelism is used as a specific numerical angle such as 45° or 90°. However, those include tolerances according to accuracies required in an optical system.

EXPLANATION OF REFERENCES 10 anti-vibration device
11 first rotational axis
12 second rotational axis
13 third rotational axis
14 four-joint link portion
15, 16 intermediate link
17, 18 pin coupling portion
30 binocle
31 main body portion
31 a front surface
32L left objective opening
32R right objective opening
33L left eyepiece portion
33R right eyepiece portion
35L left objective optical system
35R right objective optical system
36L left ocular optical system
36R right ocular optical system
37L left telephoto optical system
37R right telephoto optical system
39 battery housing portion
40 adjusting knob
41 power switch
42 battery
43 casing
44L left objective barrel
44R right objective barrel
46 control substrate
47L left erecting optical system
47R right erecting optical system
48L left eyepiece barrel
48R right eyepiece barrel
50 casing main body
50*a* bearing pin
51L left eyepiece casing
51R right eyepiece casing
52L left eyepiece opening
52R right eyepiece opening
53 main body casing
54 anti-vibration unit
54L left anti-vibration unit
54R right anti-vibration unit
55 link mechanism
56 first actuator
57 second actuator
59 barrel
59*a* bearing hole
59*b* bearing boss
59*c* upper connection boss
59*d* lower connection boss
59*e* barrel upper plate
59*f* barrel lower plate
60 first reflective member
61 holding plate
61*a* rotation pin
61*b* bracket
61*c* connecting pin
62 second reflective member
64*a* first optical axis
64*b* second optical axis
64*c* third optical axis
66: first link member
66*a* attachment portion
67 second link member
67*a* attachment portion
69 first bracket
69*a* connecting pin
70 second bracket
70*a* connecting pin
71 connecting portion
71*a* notch
72 third bracket
72*a* connection hole
74 link main body
75 connecting arm
75*a* connecting pin
77 abutment portion
77*a* abutment surface
78 urging member
80 coil substrate
80*a* coil
80*b* X-axis position sensor
81 magnet
83 coil substrate
83*a* coil
83*b* Z-axis position sensor
84 magnet
86 anti-vibration control circuit
87 ROM 88 CPU
89 vibration measurement sensor
90, 91 driver
BL left-eye optical axis
BR right-eye optical axis
La, Lb, Lc length

What is claimed is:

1. An anti-vibration device comprising:
   first reflective members that are disposed so as to be respectively inclined with respect to first optical axes, and form second optical axes by deflecting the first optical axes;
   second reflective members that are disposed so as to be respectively inclined with respect to the second optical axes, and form third optical axes parallel to the first optical axes by deflecting the second optical axes;
   holding members that each hold the first reflective member and the second reflective member, and are disposed so as to be respectively rotated around first rotational axes which are within a plane including the first optical axis and the second optical axis and cross the first optical axes or the third optical axes, the holding members each holding one of the first reflective member and the second reflective member in a fixed state, and each holding the other one so as to be rotated around a second rotational axis perpendicular to the plane including the first optical axis and the second optical axis; and
   a link mechanism that performs rotation of the pair of holding members around the first rotational axes and rotation of the other reflective members of the first reflective members and the second reflective members around the second rotational axes in a state in which the first optical axes are held in parallel with each other,
   wherein the link mechanism includes a first link member having pin coupling portions pin-coupled to the pair of holding members, and a second link member which is attached to the first link member so as to be rotated around third rotational axes parallel to the second rotational axes, and has abutment portions which engage with the other reflective members and rotate the other reflective members around the second rotational axis without rotating the one of the first and second reflective members.

2. The anti-vibration device according to claim 1, wherein the first link member has brackets which protrude in a direction of the first optical axes, the second link member has arms which protrude in the direction of the first optical axes, and the brackets and the arms are attached so as to be rotated around the third rotational axes,
   a central line of the second rotational axes and a central line of the third rotational axes match each other in a neutral state before the holding members are rotated around the first rotational axes, and
   a length of the bracket in the direction of the first optical axis, a length of the arm in the direction of the first optical axis, and a length of the holding member in the direction of the first optical axis from the first rotational axis to the pin coupling portion are equal to one another.

3. The anti-vibration device according to claim 2, further comprising:
   connecting pins that are provided on a rear side of the other reflective member, and engage with the abutment portions;
   circumferential surfaces that are respectively formed on the abutment portions and the connecting pins in order for the abutment portions and the connecting pins to be in point-contact with each other; and
   urging members that urge the circumferential surfaces in a direction in which the circumferential surfaces are in contact with each other.

4. The anti-vibration device according to claim 3, further comprising:
   a first actuator that moves the first link member in an arrangement direction of the holding members; and
   a second actuator that rotates the second link member around the third rotational axis,
   wherein the first actuator is a voice coil motor having a magnet and a coil, and the coil is fixed to the first link member, and
   the second actuator is a voice coil motor having a magnet and a coil, and the coil is fixed
   to the second link member.

5. The anti-vibration device according to claim 4, wherein the second optical axes and central lines of the first rotational axes are arranged on the same line.

6. A binocle comprising:
   objective optical systems each having a positive composite focal length;
   ocular optical systems; and
   the anti-vibration device according to claim 1 provided between the objective optical systems and the ocular optical systems.

7. The binocle according to claim 6, wherein the ocular optical systems each have a positive composite focal length, and erecting optical systems that invert an optical image in vertical and horizontal directions are provided between the anti-vibration device and the ocular optical systems.

* * * * *